United States Patent [19]

Holtey et al.

[11] 3,909,789

[45] Sept. 30, 1975

[54] DATA PROCESSING APPARATUS INCORPORATING A MICROPROGRAMMED MULTIFUNCTIONED SERIAL ARITHMETIC UNIT

[75] Inventors: Thomas O. Holtey, Newton Lower Falls; Shashi M. Rajpal, Cambridge; Edward B. Tymann, Natick, all of Mass.

[73] Assignee: Honeywell Information Systems Inc., Waltham, Mass.

[22] Filed: Nov. 24, 1972

[21] Appl. No.: 309,583

[52] U.S. Cl. .............................. 340/172.5; 235/156

[51] Int. Cl.[2] .............................................. G06F 7/38

[58] Field of Search .................. 340/172.5; 235/156

[56] References Cited

UNITED STATES PATENTS

| | | | |
|---|---|---|---|
| 3,234,523 | 2/1966 | Blixt et al. | 340/172.5 |
| 3,434,112 | 3/1969 | Yen | 340/172.5 |
| 3,473,160 | 10/1969 | Wahlstrom | 340/172.5 |
| 3,631,400 | 12/1971 | Dervan et al. | 340/172.5 |
| 3,681,761 | 8/1972 | Schuenemann et al. | 340/172.5 |
| 3,701,105 | 10/1972 | Finnegan et al. | 340/172.5 |
| 3,718,912 | 2/1973 | Hasbrouck et al. | 340/172.5 |
| 3,745,532 | 7/1973 | Erwin | 340/172.5 |
| 3,760,171 | 9/1973 | Wang et al. | 340/172.5 |
| 3,800,290 | 3/1974 | Croxon | 340/172.5 |

OTHER PUBLICATIONS

Schmookler, M. S., "Logical Connectives," in IBM Tech. Discl. Bull., Vol. 6, No. 1, June, 1963, pp. 55–56.

*Primary Examiner*—Gareth D. Shaw
*Assistant Examiner*—John P. Vandenburg
*Attorney, Agent, or Firm*—David A. Frank; Ronald T. Reiling

[57] ABSTRACT

A combination microinstruction set and control circuitry for an arithmetic and logic unit is disclosed. The control circuitry implements in response to an arithmetic unit portion of each microinstruction in the microinstruction set all arithmetic and logic, i.e., logical AND, exclusive OR, inclusive OR, functions. Moreover, the control circuitry functions as a central data path for any modification or transfer operation in the data processing system. Each microinstruction defines the selected sources, structures the data paths for the control circuitry, sets up the initializing conditions, and enables any logical function. The unique microinstruction set alters the operation of the control circuitry resulting in only a minimum amount of control circuitry to implement the basic logic functions.

24 Claims, 7 Drawing Figures

| MICROINSTRUCTION TYPE | ROM BITS FROM MEMORY 102 | | | | | | | | | | | | | | |
|---|---|---|---|---|---|---|---|---|---|---|---|---|---|---|---|
| | 14 | 13 | 12 | 11 | 10 | 9 | 8 | 7 | 6 | 5 | 4 | 3 | 2 | 1 |
| TYPE 1 | 0 | T/M | AUF 0000 THRU 1110 | | | | B | T | α | | | | | |
| TYPE 2 | 1 | T/M | AUF 0000 THRU 1110 | | | | 0 | 0 | 0 | 0 | 0 | 0 | 0 | 0 |
| TYPE 3 | 1 | T/M | AUF 0000 THRU 1110 | | | | FROM 0 0 0 0 0 0 0 1 TO 1 1 1 1 1 1 1 1 | | | | | | | |

AUF TABLE

| AUF FUNCTION | AUF VALUE | BIT POSITION IN REGISTER U12 | U11 | U10 | U09 | AU1 INPUT | LOGICAL FNC | AU2 INPUT | CARRY FNC | AUO OUTPUT |
|---|---|---|---|---|---|---|---|---|---|---|
| SUM 1 | 0 | 0 | 0 | 0 | 0 | $\alpha$ | $+$ | SR | 0 | $SR+\alpha$ |
| SUM 2 | 1 | 0 | 0 | 0 | 1 | $\alpha$ | $+$ | SR | L | $SR+\alpha+C$ |
| AND | 2 | 0 | 0 | 1 | 0 | $\alpha$ | $\wedge$ | SR | L | $SR\wedge\alpha$ |
| HAD | 3 | 0 | 0 | 1 | 1 | $\alpha$ | $\oplus$ | SR | L | $SR\oplus\alpha$ |
| SUM 1 | 4 | 0 | 1 | 0 | 0 | $\alpha$ | $+$ | SR | 0 | $SR+\alpha$ |
| SUM 2 | 5 | 0 | 1 | 0 | 1 | $\alpha$ | $+$ | SR | L | $SR+\alpha+C$ |
| AND | 6 | 0 | 1 | 1 | 0 | $\alpha$ | $\wedge$ | SR | L | $SR\wedge A$ |
| HAD | 7 | 0 | 1 | 1 | 1 | $\alpha$ | $\oplus$ | SR | L | SR |
| INCREMENT 1 | 8 | 1 | 0 | 0 | 0 | $\alpha$ | $+$ | 0 | 1 | $\alpha+1$ |
| INCREMENT 2 | 9 | 1 | 0 | 0 | 1 | $\alpha$ | $+$ | 0 | L | $\alpha+C$ |
| INCLUSIVE OR | 10 | 1 | 0 | 1 | 0 | $\alpha$ | $\vee$ | SR | L | $SR\vee\alpha$ |
| ROTATE | 11 | 1 | 0 | 1 | 1 | 0 | $\oplus$ | SR | L | SR |
| SUBTRACT 1 | 12 | 1 | 1 | 0 | 0 | $\bar{\alpha}$ | $+$ | SR | 1 | $SR-\alpha$ |
| SUBTRACT 2 | 13 | 1 | 1 | 0 | 1 | $\bar{\alpha}$ | $+$ | SR | L | $SR-\alpha-C$ |
| LOAD | 14 | 1 | 1 | 1 | 0 | $\alpha$ | $\vee$ | 0 | L | $\alpha$ |
| NOTHING | 15 | 1 | 1 | 1 | 1 | 0 | $\oplus$ | 0 | L | 0 |

Fig. 3.

| | OR | AND | ARITH | HAD | 234 | 238 | 236 | 244 | 248 | 246 |
|---|---|---|---|---|---|---|---|---|---|---|
| A | 1 | 0 | 0 | 0 | $A_1+A_2$ | $\overline{A_1+A_2}$ | 1 | $A_1+A_2$ | 0 | $A_1+A_2$ |
| B | 0 | 1 | 0 | 0 | $A_1+A_2$ | 1 | $\overline{A_1 \bullet A_2}$ | $A_1 \bullet A_2$ | 0 | $A_1 \bullet A_2$ |
| C | 0 | 0 | 1 | 0 | $A_1+A_2$ | $\overline{A_1+A_2}$ | $\overline{A_1 \bullet A_2}$ | $A_1 \oplus A_2$ | AUC | $A_1 \oplus A_2 \oplus A_C$ |
| D | 0 | 0 | 0 | 0 | $A_1+A_2$ | $\overline{A_1+A_2}$ | $\overline{A_1 \bullet A_2}$ | $A_1 \oplus A_2$ | 0 | $A_1 \oplus A_2$ |

| | $A_1$ | $A_2$ | $A_C$ | $\overline{A_1+A_2}$ | $\overline{A_1 \bullet A_2}$ | 252 | 254 |
|---|---|---|---|---|---|---|---|
| 1 | 0 | 0 | 0 | 1 | 1 | 1 | 0 |
| 2 | 0 | 0 | 1 | 1 | 1 | 1 | 0 |
| 3 | 0 | 1 | 0 | 0 | 1 | 1 | 0 |
| 4 | 0 | 1 | 1 | 0 | 1 | 0 | 1 |
| 5 | 1 | 0 | 0 | 0 | 1 | 1 | 0 |
| 6 | 1 | 0 | 1 | 0 | 1 | 0 | 1 |
| 7 | 1 | 1 | 0 | 0 | 0 | 1 | 1 |
| 8 | 1 | 1 | 1 | 0 | 0 | 0 | 1 |

DATA PROCESSING APPARATUS INCORPORATING A MICROPROGRAMMED MULTIFUNCTIONED SERIAL ARITHMETIC UNIT

BACKGROUND OF THE INVENTION

A. Field of the Invention

The invention relates to a general purpose data processing system and more particularly to a combination microinstruction set and control circuitry for performing the arithmetic and logical functions required of a general purpose computer.

B. Description of the Prior Art

Basic to a digital computer is that portion of the apparatus which performs the arithmetic and/or logical functions. Such apparatus comprises a plurality of logic gates for receiving two binary numbers to be added. Usually, these binary numbers are transferred from registers which are coupled to a main memory. As a result, for access from other registers in different parts of the system, as, for example, the main memory address register or the registers associated with any input/output device, additional circuitry is needed.

In some larger versions of modern computers, information is exchanged by means of a common bus. Thus, in order for information to be transferred from a source to a destination, the data is placed onto a common bus and sensed by the destination point. This permits a great deal of flexibility in the data paths since it is possible to move information to any location in the computer by just causing the information to be generated on the common bus. This concept of a common bus, however, does not generally include an arithmetic capability. Furthermore, it is not always possible to provide some of the information changes or modifications that these other registers require since the arithmetic and logic units may not have the necessary control capabilities. The present invention not only provides apparatus having the capability of functioning as a central data path to any of the registers in the data processing system but also has the feature that it provides during each transfer all the arithmetic and logical, i.e., exclusive OR, inclusive OR, logical AND, functions.

The control circuitry needed to accomplish the above is provided in a small serial bit data processing machine. Because a serial bit machine operates only on one bit at a time, it is important that the sources of information in addition to the operations to be performed on these sources be defined quickly. To this end, a read only memory storing a plurality of microinstructions is provided. Each microinstruction in the read only memory comprises a set of microoperations which are executed to accomplish a particular function. In the present invention, the signals from the microinstruction override the usual function provided by the logic in the arithmetic unit so that a particular logical operation is performed. Since this feature utilizes the basic circuitry of the arithmetic unit, the overall circuitry is simplified.

In addition to and concurrent with the functional signals, each microinstruction combines with a selection mechanism to choose the source of information from a plurality of various inputs. Thus the control circuitry further performs the function of a central data path. This alleviates the problem of providing other circuitry for various parts of the data processor while centralizing operations.

OBJECTS OF THE INVENTION

It is a primary object of the present invention to provide a unique microinstruction set which minimizes the control circuitry needed in an arithmetic and logic unit of a serial bit data processing machine.

It is a further object of the invention to provide an arithmetic and logic unit that provides in addition to all the computational capability required, all the transferring ability needed by a data processor and hence is used as the central data path in a data processing system.

It is another object of the invention to provide a combination microinstruction set and control circuitry which provides an entire selection process for conditioning a desired output by overriding the normal functions of various gates to provide a specific operation within the arithmetic and logic unit.

It is yet a further object of the invention to provide an arithmetic and logic unit having a capability of a common bus.

SUMMARY OF THE INVENTION

Briefly and in accordance with the above objects, the present invention is concerned with a direct and unique microinstruction set for controlling the operation of an arithmetic and logic unit. Each microinstruction is provided to control circuitry and enables selected gates which define the applicable sources for the particular operation. The same microinstruction is also provided to the arithmetic unit such that control over the operation to be performed is provided. If an arithmetic operation is indicated, the microinstruction sets up the initial conditions in the control circuitry, enables the carry function and defines the specific arithmetic (i.e., addition or subtraction) function. If a logical operation is indicated, the microinstruction disables the carry function and enables portions of the arithmetic unit to combine in a predetermined manner so as to provide an exclusive OR, inclusive OR or logical AND operation.

BRIEF DESCRIPTION OF THE DRAWINGS

The foregoing and other objects, features and advantages of the invention will be apparent from the following more particular description of a preferred embodiment of the invention, as illustrated in the accompanying drawings.

In the drawings:

FIG. 3 illustrates one portion of the microcommand format shown in FIG. 2, which portion enables the arithmetic and logic unit functions.

DETAILED DESCRIPTION OF THE PREFERRED EMBODIMENT

Figures 1, 2:
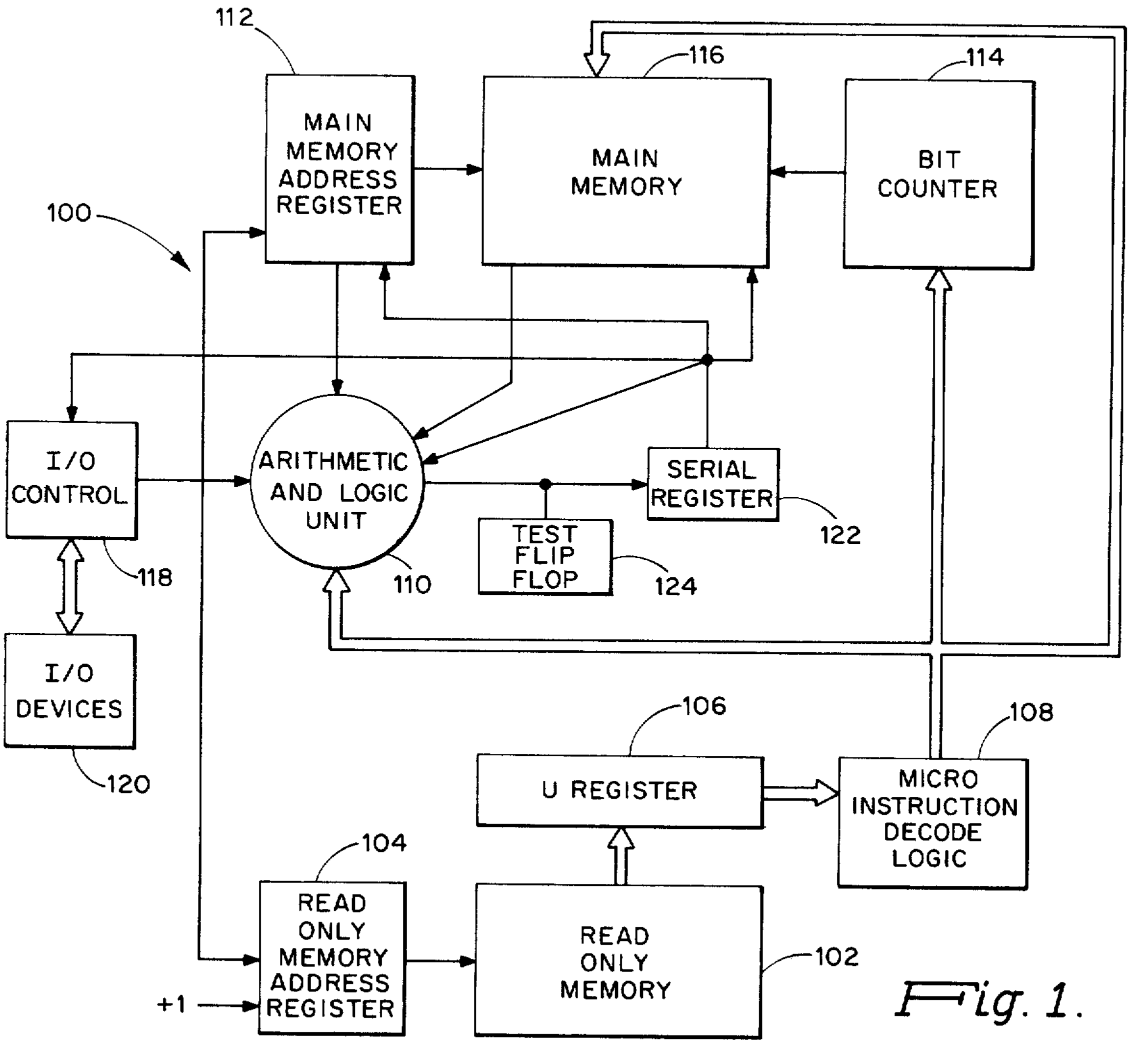
FIG. 1 is a block diagram showing a data processing system in which the novelty of the present invention may be utilized.
FIG. 2 illustrates a preferred embodiment of three microinstruction configurations which may be utilized in the present invention.

In order to provide a clear understanding of the present invention, a preferred embodiment thereof will be considered from a number of viewpoints and in an order which will best reveal the novel features and advantages of the invention. First, an overall view of the environment in which the present invention may be utilized will be presented. Next, a listing of the microinstructions and their effects will be presented to illustrate the overall system operation. Third, the microcommand format for the control circuitry will be presented to illustrate the various types of operations to be performed. Next, the basic system hardware will be shown with reference to the preferred logical circuitry for forming the hardware components. Finally, an explanation of the logical circuitry operation of the system will be presented using truth tables to illustrate the details of the system operation. The primary purpose of these descriptions is to provide a clear understanding of the invention which will permit those skilled in the art to practice the invention and achieve its objects and advantages.

The same reference numerals have been used to designate corresponding elements throughout the respective views of the drawings where possible thereby facilitating a ready understanding of the relationship therebetween.

In the basic block diagram illustrated in FIG. 1, there is shown one type of digital processing unit 100 in which the present invention finds utility. Digital processing unit 100 illustrates the system architecture of a serial bit, electronic data processing system which performs local input/output operations, local processing, and communication functions, all under the control of a stored user program. A read only memory (ROM) 102 provides control for the digital processing unit 100 by means of various type microinstructions, some of which are shown in FIG. 2. ROM address register 104 addresses ROM 102 and the microinstruction is read out into a U register 106. For a further explanation of the overall ROM operation, see U.S. Pat. No. 3,728,690, issued on Apr. 17, 19733 entitled "Branch Facility Diagnostics" invented by Thomas O. Holtey et al, which describes other features of the system of which this invention is a part.

Decode logic 108 interprets the bit combination provided by U register 106 as microoperations and subcommands. (For a fuller discussion of microinstruction decoding, see page 467 of a book entitled, "Digital Computer Design Fundamentals," by Yaohan Chu, published by McGraw-Hill Book Company.) Decode logic 108, in response to the particular bit combinations, is coupled to arithmetic and logic unit 110, main memory 116 and a bit counter 114. Arithmetic and logic unit 110 performs desired logic operations and desired arithmetic operations on information provided to it. Arithmetic and logic unit 110 is coupled so that it is capable of modifying any serial transfers or memory operations of data processor 100. Main memory address register 112 selects memory locations in main memory 116 or may provide an input to arithmetic and logic unit 110. Bit counter 114 is also coupled to main memory 116 and controls the number of times that a microinstruction is executed. Main memory 116 may be functionally organized into two parts. The first 256 bytes are allocated for microprogram use as a memory for storage of various status bytes, counters, and registers. The remainder of main memory 116 is for the use by the user program as buffers, instruction and other data.

The arithmetic and logic unit 110 is also connected to input/output control logic 118 and input/output devices 120. The input/output devices may be tape units, printers, data sets for use in communication, etc. Any information which is contained in an I/O device is transferred through arithmetic and logic unit 110. If any modification or change is required to the information being presented by the I/O devices 120, arithmetic unit 110 in combination with the control functions supplied by ROM 102 is capable of providing this function.

The output of arithmetic and logic unit 110 is connected to a serial register 122 and a test flip-flop 124. Serial register 122 is an 8 bit shift register which functions essentially as an accumulator. The output of register 122 is controlled by the ROM microinstruction memory 102 and may be delivered to main memory 116, circulated back to the arithmetic and logic unit 110, delivered to main memory address register 112, or transferred back to any of the I/O devices 120. Test flip-flop 124 is utilized to test the information supplied to serial register 122 by arithmetic and logic unit 110 for specific bit combinations.

In the specific embodiment illustrated, all microoperations represented in a single word are operations to be performed substantially simultaneously. This operation simplifies the hardware by avoiding the necessary timing circuits required for sequencing operations specified in a single word.

Referring now to FIG. 2, three types of microinstructions are illustrated. In actual practice, there are seven microinstruction types which may be expanded if new functions are needed. However, for purposes of this invention, these three microinstruction types provide the control functions to the arithmetic and logic unit 110. A type 1 microinstruction is determined by a binary ZERO in the fourteenth bit location and by an arithmetic and logic unit function (AUF) in bit positions 9 through 12. This AUF function has binary values of 0000 to 1110. A type 1 microinstruction has control over most of the processor's data paths. A type 1 microinstruction selects the inputs to be delivered to the arithmetic unit 110, the operation to be performed by the arithmetic and logic unit on the selected inputs, and the register to which the output of the arithmetic and logic unit 110 will be transferred. This is accomplished as follows. Bits 1 to 6 select any one of 64 possible sources for an input. Bits 9 to 12 specify the operation which is to be performed on the selected input. Bits 14 and 13 specify the type 1 microinstruction, and bit 13 further indicates the destination register of the selected input. The AUF functions from bits 9 to 12 will be more fully described with reference to FIG. 3, and the selection of the desired input, i.e., bits 1 to 6, will be further described with reference to the control circuitry shown in FIG. 4.

Both type 2 and type 3 microinstructions set the data paths in a fixed manner and modify the contents of the data being transferred to the arithmetic and control unit 110. The type 2 microinstruction is determined by bit 14 being a binary ONE, by an AUF function in bit positions 9 through 12 and by bits 1 to 8 being binary ZEROS. A type 2 microinstruction enables the present contents of main memory address register 112 to address a location in main memory 116, which information is then serially transferred into arithmetic and logic unit 110. A type 3 microinstruction is determined by bit 14 being a binary ONE, by an AUF function in bit positions 9 through 12 and by bits 1 to 8 not being all binary ZEROS. The lower eight bits in the type 3 microinstruction are provided to main memory 116 in order to select an address from main memory 116. The information in the addressed main memory location is then serially transferred to arithmetic unit 110 where the operation indicated by AUF function will be performed. Both types 2 and 3 microinstructions indicate the source of two inputs to the arithmetic and logic unit 110 as well as the operation to be performed thereon. Both types 2 and 3 also have a test and modify bit in bit location 13 which indicates the destination register of the processed contents from arithmetic and logic unit 110.

Referring now to FIG. 3, a more detailed examination of the AUF portion of the microinstruction is shown. The portion of this microinstruction, bits 9 to 12 as shown from right to left in FIG. 2, enables the desired functions to be performed by the arithmetic and control logic 110. These functions are generated by ROM 102 into microinstruction and decode logic 108 and then gated into the arithmetic unit 110 to set up its logic circuitry 110 as will be shown in FIG. 4. FIG. 3 shows the various combinations which the four bit AUF function can have and the specific logical and arithmetic operations which the bit combinations provide. Each of these operations is applicable to type 1, type 2 or type 3 microinstructions. An AUF function also determines the two inputs or sources which are provided to the arithmetic and logic unit 110. These inputs are designated as alpha ($\alpha$) for the first operand input and SR, which stands for the bits contained in serial register 122 of FIG. 1, as the second input. The first input is designated as alpha since for a type 1 microinstruction a selection process may select any of a variety of inputs to provide the first input as will be subsequently explained. For a type 2 microinstruction, alpha will be the contents of main memory address register 112. For a type 3 microinstruction, alpha will be the main memory 116 location as specified by the last eight bits of the microinstruction.

Referring more specifically to FIG. 3, a summing operation is provided for an AUF function 0, i.e., bits 9 to 12 are 0000. By this is meant that the control circuitry to be shown in FIG. 4 will be set up so that the combination of two inputs are added to each other. When an AUF function 0 is provided, the carry logic is initialized to zero so that only the sum of the two input bytes is provided. This AUF function 0 is especially useful when an initial addition operation is required to be performed. This function clears the carry logic and sets up the control circuitry so that a byte from each of the inputs may be arithmetically combined. For purposes of clarity, one byte is defined as eight bits and constitutes a normal word in the data processing unit 100.

An AUF function 1, i.e., the bit combination being 0001, also provides an addition operation between two input variables. This function differs from AUF 0 in that it provides the added feature that the carry value in the carry logic is preserved. This arithmetic unit function is useful, for instance, when an arithmetic operation of more than one byte is to be performed. For example, if an addition operation of two bytes was required, when the second bytes of each of the inputs are added together, an AUF function 1 would be utilized. With this AUF function, the carry value present from the addition first bytes the firstbytes is provided to the initial addition of the first bits of the second bytes. As is evident, the carry logic is not cleared from one microinstruction to another, and the AUF function utilizes this feature.

For an AUF function 2, a logical ANDing operation is provided. This logical operation may be used, for example, to mask certain bits of a word or to test selected bits. In rewinding a tape unit, a status bit denoting certain information about the tape unit must be sensed. This is accomplished by logically ANDing the status bit with a constant and and testing the output. The constant may be, for example, all binary ZEROS except for the position of the status bit. Thus, the output for all the bits save the one in question would be masked. This status bit can be sensed by test flip-flop 124 in FIG. 1 and the information resulting therefrom utilizing. AUF function 2 renders the carry logic inoperative. This results since a logical operation can only be performed on two inputs.

For an AUF function 3, a half-add or, as is more commonly known, an exclusive OR logical operation is provided. Again, the carry logic is not applied since a logical operation precludes its use. A half-adding operation is utilized when it is desired to compare two numbers. Thus, for example, if a sum has been generated and it is desired to compare this number to a constant or a predetermined number to determine whether they are equal, an AUF function 3 would be utilized.

AUF functions 4 and 5 provide the same operations as those provided by AUF functions 0 and 1 respectively. However, these two functions are important when considered with bit 13 of the microinstruction. As alluded to earlier, bit 13 provides a test and modify microcommand. When an AUF function 4 or 5 is presented, the test and modify bit may provide a form of adaptive decoding. By this is meant that the same function is provided, but the results may be delivered to gates other than those normally supplied. For example, when an AUF value of zero is presented, the input is rewritten in the original location and the sum is provided to serial rgister 122. When an AUF function 4 is provided, the sum is provided to the serial register 122, and in addition, the sum is also written into the original location. Hence, the original values as presented to the inputs of the arithmetic unit 110 are destroyed. It should be noted that the arithmetic function is highly utilized in this system and hence the added flexibility of altering the contents of the main memory location saves at least one microinstruction by the test and modify microcommand. An exemplary use of AUF functions 4 and 5 would be for decrementing the main memory address register 112. If a two byte number in main memory were to be added, the address register 112 would provide the lower byte first and then the higher byte. The contents of address register 112 would be added with a second input having all binary ONES. The test and modify bit would be high thus writing the decremented output back into the main memory address register 112.

The AUF functions of 6 and 7 provide a logical AND operation and an exclusive OR operation, respectively, just as AUF functions 2 and 3. Again, the test and modify microcommand provides for the logical output to be placed in different registers. These microinstructions are utilized when the new output resulting from the logical operation is desired to be stored in the source input instead of the previous contents that were operated upon.

AUF function 8 provides for an arithmetic operation. However, for an AUF function 8, the second input, i.e., the serial register 122, is forced to zero by control logic in the arithmetic and logic unit 110. AUF function 8 also differs from AUF instructions 0 and 4 in that the carry logic is initialized to a binary ONE instead of a binary ZERO. This AUF function is valuable for use as an incrementing instruction. For example, when address register 112 is to be incremented, it will be selected as the first, i.e., alpha, input. A microinstruction will provide an AUF function 8 so that it is combined with a second input having all zeros. However, the initial bit provided by the address register 112 will be incremented because the carry logic provides a binary ONE. Thus, the address register will then be able to select the next successive location in main memory 116.

AUF function 9 provides an arithmetic operation. It is similar to AUF function 8 in that the second input is forced to zero. AUF function 9, however, has the carry value from the carry logic preserved, in contradistinction to AUF function 8 wherein the carry is initialized to a binary ONE. This function is particularly useful when, as was the case for AUF function 1, a two byte word is to be utilized. After the result of the first combination of bytes has been computed, the carry value in the carry logic is preserved. Once the second bytes have been selected, the carry value resulting from the summed first bytes would be added to the first bits of the second byte combination to provide the total sum.

AUF function 10 provides a logical OR or, as it is sometimes known, an inclusive OR operation. The carry initialization is also left alone as is the case with all logical functions. AUF function 10 has utility in those instances requiring status flag settings and character code manipulation. For example, for a status field having a bit concerned with error control, the generation of an error bit is important. The serial register 122 would be provided with a constant having all binary bits of zero value in each position except for the control bit which contains the error indication. By providing the logical OR function, and by having alpha be the status word, the value of the status bit can be manipulated. Other applications may also utilize the logical OR function.

AUF function 11 provides for a half-add logical operation. This function forces the first input to a binary ZERO value such that the contents of the SR register 122 may be rotated. Thus, for example, if a sum has just been generated and it is desired to transfer this sum to an I/O device or to any of the working registers in the system, then AUF function 11 is provided. This instuction may also be utilized when it is desired to write the contents of the SR register 112 into any selected destination register since it provides for a simple moving operation.

AUF function 12 provides for an arithmetic operation. More specifically, this function provides for the subtracting operation of two numbers. In accomplishing this function, the first input is negated before it enters the arithmetic and logic unit 110. The carry logic is initialized to a binary ONE and a two's complement subtraction, as is well known in the computer art, is performed. Thus, an AUF function 12 sums the negatived first input to the positive second input, i.e., the contents in the serial register, with the difference resulting.

AUF function 13 is also utilized for a subtracting operation. However, the carry logic is not initialized but rather the value it contains is preserved. This function is especially useful when more than one byte is utilized in a subtracting operation. If a two byte number is used, AUF function 13 is generated for the subtraction of the second byte of the two byte number. It should be noted that the two byte number is taken as a whole and hence the initial bit of the second byte does not have to be two's complemented as would be the case for the operation on the lowest ordered byte of the two byte number.

AUF function 14 provides a logical OR operation. This function is comparable to AUF function 10, but instead of forcing the first input to zero, it forces the second input to zero. This function is useful in bringing in information from an I/O device where it is desired that this information remain unchanged. Thus, when transferring data from a peripheral source 120 to the SR register 122, the logical function provided by AUF 14 is utilized.

AUF function 15 inhibits the operation of the arithmetic unit 110. This is accomplished since both the first and second inputs are forced to zero by the control circuitry. When an AUF function 15 is provided, nothing happens in the arithmetic and logic unit 110. The bit combination is, however, utilized in other microinstruction types as may be seen in the U.S. Pat. Application by Thomas O. Holtey et al, Ser. No. 175,266, referred to hereinbefore. Since this AUF function is utilized in other microinstruction types, greater flexibility and use of adaptive decoding is provided.

An examination of the above functions indicate some useful relationships. For example, the bit position 10 is utilized to determine whether or not an arithmetic or logical function is provided. Thus, if bit 10 is a binary ZERO, an arithmetic operation occurs. If bit 10 is a binary ONE, then a logical operation results. When bits 9 and 10 are binary ZEROS, the carry logic is initialized to a predetermined value. If bit 12 is a binary ZERO, then the carry logic is initialized to a binary ZERO. If bit 12 is a binary ONE, then the carry logic is initialized to a binary ONE. The AUF functions explained above provide sufficient flexibility so as to perform any transfer operation to the working registers involved in the digital computer unit 100 as shown in FIG. 1. In addition to this common bus feature, it will be seen that any arithmetic and/or logical operation may be performed on the transferred information. Moreover, the AUF functions simplify the design of the control circuitry as shown in FIG. 4 so that only a minimum number of gates are used to obtain these functions.

Figure 4:
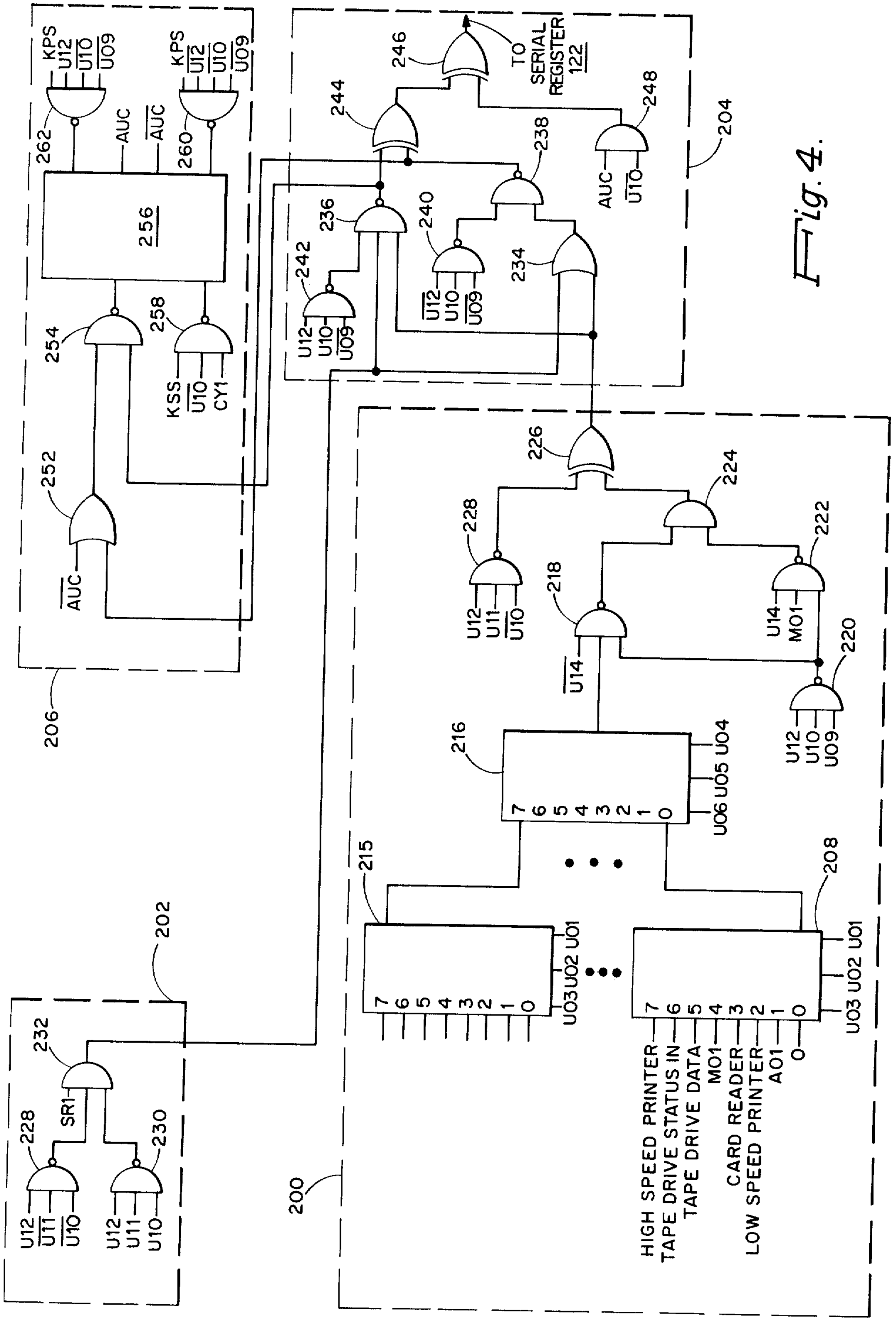
FIG. 4 is a detailed schematic diagram illustrating a preferred embodiment of the arithmetic and logic unit of the present invention.

The implementation of the AUF functions as referred to in FIG. 3 will become clear when taken in combination with the control circuitry as illustrated in FIG. 4. FIG. 4 shows the basic arithmetic and logic unit 110 as a plurality of gates some of which are responsive to the AUF functions. These gates will either enable the arithmetic function or modify the arithmetic function so that logical operations are provided.

Referring more particularly to FIG. 4, the control circuitry is responsive to the AUF functions as indicated by the sedignations U09, U10, U11, and U12, which are bits 9 to 12 of the microinstruction, respectively. For a binary ONE bit designation, a bar (—) over the bit designation is provided. For example, if AUF function 8, i. e., 1000, is selected, the representation in the control circuitry would be $\overline{U12}$, U11, U10 and U09.

Reference numeral 200 indicates in the dotted lines the selection logic utilized for selecting and defining the first input or source. Reference numeral 202 indicates the selection logic utilized for selecting and defining the second input or source. Reference numeral 204 indicates the combinatorial logic for either an arithmetic or logical operation and reference numeral 206 indicates the carry logic. The three microinstruction types having AUF functions enable the selection logic 200 and 202 to define the sources. These sources are then combined by the logic in 204 in accordance with the arithmetic or logical operation that has been designated by the AUF function. If an arithmetic operation has been enabled, then carry logic 206 completes the combinatorial circuitry required.

Referring more specifically to the first input 200, there is shown eight input multiplexers 208 to 215. These multiplexers may be, for example, an eight channel digital switch made by Fairchild and described in Fairchild Semiconductor Circuit Data Catalog 1970 by Schwerber under the description DM7210/DM8210 on page 95. Each multiplexer may be coupled to a variety of input/output devices 120 and/or working registers in data processing unit 100. For example, connected to multiplexer 208 are input/output devices such as high and low speed printers, tape drives which have status and data control bit information, and card readers. At other inputs, multiplexer 208 has connected main memory address register 112 (A01) shown in FIG. 1, any main memory 116 location (M01) and ground (0). These inputs are merely exemplary and may be easily interchanged depending on the number and type of peripheral equipment which may be committed in the overall system. For example, if the overall system were utilized at a race track, most of the inputs would be I/O devices connected to the tote board.

The selection of the particular input to multiplexers 208 to 215 is determined by a type 1 microinstruction as shown in FIG. 2. More specifically, the lower order three bits of this microinstruction, i.e., bits 1 to 3, enable one of the inputs connected to each multiplexer 208 to 215. For example, if bits U03, U02, and U01, entering into the multiplexers 208 to 215 at its bottom, are 1, 0, 0, respectively, the information provided by the fourth input of each multiplexer would be transferred via each multiplexer's output. Multiplexer device 216 has one input coupled to the outputs of each multiplexer 208 to 215. Multiplexer 216 has connected to it the next higher order three bits from a type 1 microinstruction. These are indicated as U06, U05, and U04. Again, depending upon the specific configuration of the three bit configurations, only one of the 8 inputs is selected. Thus, the combination of multiplexers 208 to 215 and 216 provide a one out of 64 selection process. Stated differently, of the 64 inputs which may be provided to the digital computer 100, only one of them at a given time provides information to the arithmetic and control unit 110.

The output of multiplexer 216 is coupled to NAND gate 218. NAND gate 218 has a second input from NAND gate 220 and a third input coupled to the fourteenth bit ($\overline{U14}$) of the ROM microinstruction and responsive to a binary ZERO. NAND gate 220 is also coupled to NAND gate 222 which, in turn, has a second input from the main memory 116, designated as M01, and a third input coupled to the fourteenth bit (U14) of the ROM microinstruction and responsive to a binary ONE.

NAND gate 220 detects the AUF functions 11 or 15 which are significant for a rotating operation of the second input. If NAND gate 220 is enabled, a low signal is provided to NAND gates 218, 222. This low signal ensures that a high signal is provided by NAND gates 218, 222. In this situation, control gate 220 overrides the other input signals with the result that the first source input is a binary ZERO. Since the second input would be combined with a binary ZERO, a rotating of the second input is accomplished. If another AUF function, i.e., other than 11 or 15, is present, NAND gate 220 provides a high signal to NAND gates 218, 222. This high signal does not control the output of gates 218, 222 and hence permits another variable to control their conduction.

This other variable is the type microinstruction which has been generated from ROM memory 102. If a type 1 microinstruction is presented and an AUF function of 11 or 15 is not present, NAND gate 218 is enabled. As was stated earlier, a type 1 microinstruction has a binary ZERO for the fourteenth bit position. The $\overline{U14}$ input to NAND gate 218 inverts this binary ZERO to a binary ONE. With two high signals at its inputs, NAND gate 218 enables the bits provided by the source register, which had been selected by multiplexer 208-216, to control its output signal. If the type 2 or 3 microinstruction is presented, then a low signal is provided to NAND gate 218 and its output must be a high signal. However, the U14 input to NAND gate 222 would be a high signal, and thus, the information bit provided from main memory 116, i.e., M01, would be transferred. Either NAND gate 218 or 222 must be high, if NAND gate 220 is not enabled, since the control bit 14 is high to one of the gates. For the gate having two high signals at its input, that gate provides the actual bit which has been selected. The other nonselected gate merely provides a high control signal output since it has one low control signal at its input.

NAND gates 218 and 222 provide the input signals to AND gate 224. The function of AND gate 224 is to complete the selection of the information bit. If the selected bit is a binary ZERO, gate 224 has two high signals at its inputs and hence provides a high signal output. If the selected bit is a binary ONE, AND gate 224 has one low signal and one high signal at its inputs and hence provides a low signal output. These signals are the opposite of the selected bit since NAND gates 218 and 222 invert the selected bit.

The output of AND gate 224 is coupled to an exclusive OR gate 226. A second input is provided to exclusive OR gate 226 from NAND control gate 228. Control gate 228 is responsive to an AUF function of 12 or 13 and detects whether or not a subtraction operation is to be performed. If control gate 228 is enabled, it provides a low control signal to exclusive OR gate 226. This low control signal allows the negative bit as supplied by gate 224 to pass through exclusive OR gate 226. If control gate 228 is not enabled, it provides a high control signal to exclusive OR gate 226. This high control signals allows the exclusive OR gate 226 to invert the output of AND gate 224 such that actual value of the selected bit is provided. The output signal of exclusive OR gate 226 defines the first input in the arithmetic and logic unit 110.

The second input to arithmetic and logic unit 110 is defined by the control circuitry within dotted lines 202. More specifically, NAND gates 228, 230 and AND gate 232 are utilized. AND gate 232 has three inputs, the first one SR1 being coupled to serial register 122 of FIG. 1. Normally, the value contained in this serial register is provided as the second input to the arithmetic unit. However, if either of two conditions prevail, this will not be the situation. These two conditions are detected by NAND control gates 228 and 230. NAND gate 228 is enabled when an AUF function 8 or 9 is provided. For this function, an increment operation is provided, and, as a result, the contents of the serial register 122 are not desired. When NAND gate 228 is enabled, it provides a low signal which forces AND gate 232 to provide a low signal. NAND gate 230 is enabled when an AUF function 14 or 15 is provided. For this function, either a transfer of peripheral data operation is desired or the control circuitry for the arithmetic unit is to be inhibited. As a result, the value contained in the SR register 122 is not needed. When NAND gate 230 is enabled, it provides a low signal which forces AND gate 232 to provide a low signal. If neither of these control gates are enabled, i.e., neither an AUF function of 8, 9, 14, or 15, then AND gate 232 has two high signals at its input. As a result, the information bits of the SR register 122 determine the output provided by AND gate 232.

The above description of control circuitry determines the source registers presented to the control circuitry 204. The logic within reference numeral 204 usually provides a half-add or exclusive OR operation on the source inputs. However, by means of overriding gates connected to the basic circuit, the arithmetic and other logical functions are provided. There are two control gates connected to the AUF functions as described in FIG. 3 which override the half-add operation to provide the logical AND and the logical OR operation. A third control gate, when enabled, provides for the full arithmetic operation. This third gate is involved with the U10 bit position of the AUF function. This gate, when not enabled, inhibits the carry output from participating in the creation of the arithmetic and logic unit output thereby inhibiting the arithmetic operation. Hence, the configuration of the AUF function together with the control circuitry provides for the logical AND, exclusive OR, inclusive OR or arithmetic functions, inversion of the first input, or the forcing of either the first or second input to binary ZERO.

More specifically, the output of AND gate 232 and exclusive OR gate 226 are provided to both OR gate 234 and also to NAND gate 236. OR gate 234 provides one input to NAND gate 238 which has its other input connected to NAND gate 240. NAND gate 240 is connected to the AUF functions 2 or 6 and detects the logical AND condition. NAND gate 236 has its third input connected to NAND gate 242 which detects the AUF functions 10 or 14 which is the logical OR function. The outputs of NAND gates 236 and 238 are provided to exclusive OR gate 244 which, in turn, is coupled to another exclusive OR gate 246. Exclusive OR gate 246 has a second input from AND control gate 248 which has its inputs coupled to the $\overline{U10}$ bit position of the AUF function and also to the carry logic (AUC). The output of exclusive OR gate 246 is coupled to the serial of register 122 of FIG. 1. As will be seen from an examination of the truth table in FIG. 5, this output provides for any of the logical or arithmetic combinations required.

More specifically, if a logical OR operation is to be provided, the uppermost line, condition A, of the truth table indicates the logical combinations utilized. They are as follows. NAND gate 242, which detects the logical OR condition, is enabled. This control gate then provides a low signal to NAND gate 236. Since NAND gate 236 has one low input signal, its output signal must be high. This high signal is one of the two input signals to exclusive OR gate 244. The other input signal to exclusive OR gate 244 is the output of NAND gate 238. Coupled to NAND gate 238 is a control gate 240 which detects the logical AND condition. Since this condition has not been provided by the AUF function, the output of control gate 240 is high. NAND gate 238 has its other input connected to OR gate 234 which combines the first and second source signals. This is shown as $A_1 + A_2$ where $A_1$ designates the first source input and $A_2$ designates the second source input and the (+) designates an OR combination. Since the input signal to NAND gate 238 from control gate 240 is high, NAND gate 238 inverts and passes the inversion of the logically ORed two source signals to exclusive OR gate 244. Thus, exclusive OR gate 244 has the inverted logically ORed signal from NAND gate 238 and a control signal from NAND gate 236. The output signal from exclusive OR gate 244 is transferred to another exclusive OR gate 246. This output signal will be the inversion of the output signal on NAND gate 238 which is the Or combination from OR gate 234. Thus, the output from exclusive OR gate 244 is the logical OR signal. This signal is provided to exclusive OR gate 246 which has its other input connected to AND gate 248. AND gate 248 provides a low control signal to exclusive OR gate 246 since AND gate 248 is only enabled for an arithmetic condition. The control signal from AND gate 248 ensures that the signal to exclusive OR gate 246 is not inverted and hence the output of exclusive OR gate 246 is the logical OR combination.

Figures 5, 6, 7:
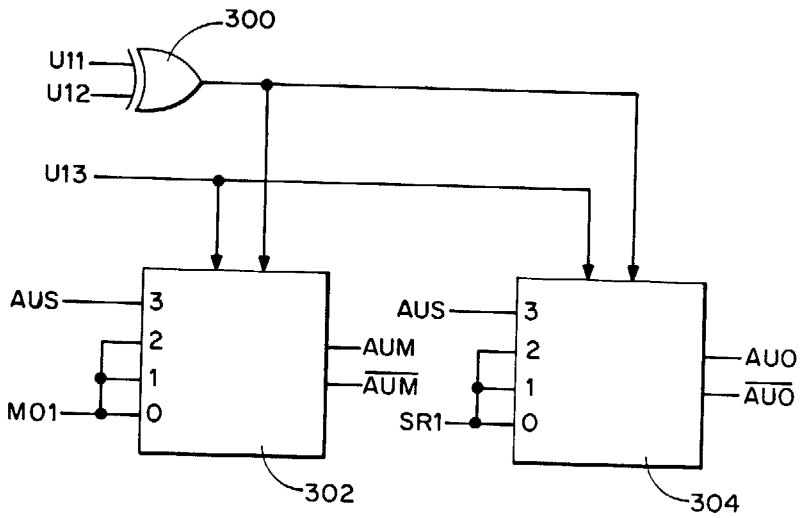
FIG. 5 is a truth table illustrating the possible combinations provided by the combinational logic 204 shown in FIG. 4.
FIG. 6 is a truth table illustrating the operation of the carry logic 206 shown in FIG. 4.
FIG. 7 is a schematic diagram of further circuitry utilized with the microinstruction set of FIG. 2.

For the logical AND function, condition B of the truth table of FIG. 5 indicates the logical combinations. The logical AND function is detected by control gate 240. Control gate 240 is enabled thereby providing a low signal to NAND gate 238. This low signal controls gate 238 such that a high control signal is provided to exclusive OR gate 244. The exclusive OR gate 244 receives its other input signal from NAND gate 236. NAND gate 236 has its three input signals as follows. Control gate 242 is providing a high signal since it is not enabled. The other two inputs are from the first and second sources. NAND gate 236 combines and inverts these signals resulting in the designation $\overline{A_1 . A_2}$. The period (.) between the two designations indicates an AND operation. Exclusive OR gate 244 then complements this combination since the control signal from NAND gate 234 is high. Hence, the output of exclusive OR gate 244 is the logical AND of the two source signals. This output is provided to exclusive OR gate 246 which merely transfers the logical AND signal. This results since the control signal from AND gate 248 is low. As was stated earlier, control gate 248 is responsive only to the arithmetic condition. Hence, the output of exclusive OR gate 246 provides the logical AND of the two source signals.

For an arithmetic operation, the control circuitry of 204 as shown by condition C of the truth table is as follows. Control gates 240 and 242 are not enabled thereby providing high signals to NAND gates 238 and 236 respectively. NAND gate 238 has its other input connected to OR gate 234 and hence passes an inverted logical OR signal to exclusive OR gate 244. This is shown as $\overline{A_1 + A_2}$. NAND gate 236 provides for the inverted logical AND signal of the two source signals since it has the two source signals and a high signal from control gate 242. This is shown as $\overline{A_1 \cdot A_2}$. Thus, exclusive OR gate 244 has one input signal representing the complemented logical AND of the two source signals and another input signal representing the complemented logical OR signal of the two source signals. Exclusive OR gate 244 sums these two signals. As is well known in Boolean algebra, the sum of these two signals is $A_1 \oplus A_2$ where $\oplus$ designates the sum. Exclusive OR gate 244 provides this sum as one input signal to exclusive OR gate 246. The other input signal to exclusive OR gate 246 is the value as detected by AND gate 248. Since this is an arithmetic operation the complement of, bit 10 provides a high signal and AND gate 248 is enabled. AND gate 248 transfers the initialized or previous carry value as an input signal to exclusive OR gate 246. Exclusive OR gate 246 then sums these two input signals, i.e., $A_1 \oplus A_2$ summed with $A_c$. This is shown as $A_1 \oplus A_2 \oplus A_c$. This sum is the total arithmetic value. As is apparent, exclusive OR gates 244 and 246 provide summing operations for the arithmetic function as opposed to the complementing and transferring operations which were provided for the logical AND and logical OR functions. This is accomplished since exclusive OR gates 244 and 246 did not have control signals as their other input signals.

The other remaining logical operation which may be provided by the control circuitry within 204 is the half-add or exclusive OR operation. This is represented by condition D of the truth table and results as follows. Neither control gate 240 or control gate 242 is enabled and hence high signals are presented to NAND gates 238 and 236 respectively. As a result, NAND gate 238 provides the complemented OR signal of the two source signals and NAND gate 236 provides the complemented AND signal of the two source signals. Exclusive OR gate 244 then sums these two input signals and provides for the half-adding or exclusive OR operation on these two signals. As was explained above, this result is $A_1 \oplus A_2$. This signal is provided to exclusive OR gate 246. The other input signal to exclusive OR gate 246 is provided by AND gate 248. This is a low signal since AND gate 248 is not enabled. As a result, exclusive OR gate 246 merely acts as a control gate and transfers the exclusive OR signal of gate 244.

In viewing the control circuitry of 204, the following observations can be made. NAND gate 238 provides for essentially three functions. These are carry generation, an arithmetic sum operation and a logical AND operation. NAND gate 236 also provides for three functions. These are carry generation, an arithmetic sum operation and a logical OR operation. Exclusive OR gate 244 functions as a complementing gate for the logical AND and the logical OR conditions. For the arithmetic and exclusive OR operation, exclusive OR gate 244 functions as a binary adder for the two source signals. Exclusive OR gate 246 provides a transferring function for the logical AND, logical OR, and exclusive OR operations. However, for the arithmetic operation, exclusive OR gate 246 functions as a summing gate and sums the carry signal to the two source signals. Thus, the control circuitry within reference numeral 204 provides a normal exclusive OR function. However, by means of the overriding control gates 240, 242, and 248, the logical AND, the logical OR, and the arithmetic sum functions, respectively, are provided.

The carry generation logic is shown within reference numeral 206. The carry value is derived as a logical equivalent of an arithmetic function. More specifically, the circuitry within 206 which is an OR gate 252 and a NAND gate 254 constitute a two out of three carry generation network. This will be evident from an examination of the truth table shown in FIG. 6.

OR gate 252 has one input connected to the previous carry signal. This carry signal is complemented as shown by the representation $\overline{AUC}$. Its other input is connected to the output signal of NAND gate 238. As was previously explained, during an arithmetic operation, the output of NAND gate 238 is a complemented logical OR of the two source signals. NAND gate 254 has one input connected to the output of NOR gate 252 and its other input connected to the output of NAND gate 236. As was explained earlier for an arithmetic operation, the output of NAND gate 236 is the complemented logical AND of the two input signals.

The truth table of FIG. 6 will now be explained. For the first situation, the two source signals are binary ZEROS and the carry logic provides a binary ZERO. With these inputs, the complemented logical OR signal from gate 238 to OR gate 252 is high. The low carry signal input is complemented and provides a high signal. Thus, OR gate 252 has two high input signals and, as a result, conducts a high signal to NAND gate 254. The other signal to gate 254 is the complemented logical AND of the two source signals. For the assumed values, this signal is high also. With two high signals at its input, NAND gate 254 provides a low signal thereby indicating that there is no carry for the next summed bits.

For the second condition presented, the carry signal is a binary ONE and the two source signals are binary ZEROS. This changes the complemented carry input to OR gate 252. However, OR gate 252 still provides a high signal output since the input signal from gate 236 is high. NAND gate 254 has a high signal from OR gate 252 and also a high signal from gate 238. As a result, NAND gate 254 provides a low carry signal.

For the third condition, the second source is a binary ONE and the first source and the carry signal are binary ZEROS. Under this situation, the $\overline{AUC}$ signal to OR gate 252 is high, and the gate 236 is low since it is a complemented logical OR signal of a binary ONE and a binary ZERO. As a result, OR gate 252 provides a high signal to NAND gate 254. The other input to NAND gate 254 is a complemented logical AND of the two source signals which is a high signal. As a result, NAND gate 254 has high signals at both its inputs and provides a low carry signal for the next carry value.

For the fourth condition, the carry signal and the second source input are binary ONES and the first source nput is a binary ZERO. This changes the $\overline{AUC}$ signal to low thus making the input signals to OR gate 252 both low. As a result, the output signal of OR gate 252 is a low signal. With low signal from OR gate 252, NAND gate 254 provides a high signal thereby indicating that a high, i.e., a binary ONE, carry signal should be presented for the next combination in the arithmetic operation.

For the fifth condition, the first source signal is a binary ONE, and the second carry signals are binary ZEROS. As a result, the $\overline{AUC}$ signal to OR gate 252 is high and the gate 238 signal is low. OR gate 252 then provides a high signal to NAND gate 254. The other signal to NAND gate 254 is also a high signal. As a result, NAND gate 254 has high signals at both its inputs and provides a low carry signal for the next arithmetic operation to be performed.

For the sixth condition, the first source signal and the carry signal are binary ONES, and the second source signal is a binary ZERO. As a result, the $\overline{AUC}$ signal and the gate 236 signal to OR gate 252 are low. Thus, OR gate 252 provides a low signal to NAND gate 254. This low signal to NAND gate 254 results in a high signal output thereby indicating that a carry should be provided for the next arithmetic operation.

For the seventh condition, the first and second source signal are binary ONES and the carry signal is a binary ZERO. With these conditions, the gate 238 signal to NAND gate 254 is low since the complemented logical AND of the two high source signals is a low signal. As a result, NAND gate 254 provides a high carry signal thus indicating that the carry value should be added in the next arithmetic operation.

For the eighth condition, the first, second, and carry signals are all binary ONES. As a result, the complemented AND input to NAND gate 254 is low thereby providing a high carry output from NAND gate 254. Thus, carry generation logic 206 provides a logical two out of three carry generation circuit.

The output from NAND gate 254 is provided to a D type flip-flop 256. This flip-flop may be, for example, one made by National Semiconductor Corporation. Reference may be found in the Digital Integrated Circuits Handbook, dated May, 1971. The reference would be to a D flip-flop, SN7474 as shown on page 65. When the output of NAND gate 254 is provided to the flip-flop 256, it may be combined with a timing signal Kss, CY1 provided by NAND gate 258. This timing signal is only provided when there is an arithmetic condition as is shown by the $\overline{U10}$ input signals to gate 258. The combination of a timing signal from NAND gate 258 with the carry signal from NAND gate 254 enables the setting of D type flip-flop 256.

D type flip-flop 256 has two additional input connections. Signals from these inputs provide for the initializing values, if needed, for the carry logic. These inputs are NAND gate 260 and 262. NAND gate 262 is responsive to a timing signal KPS and an AUF function 0 or 4. NAND gate 262 resets flip-flop 256 to a binary ZERO. NAND gate 260 is responsive to an AUF function 8 or 12 in combination with a timing signal KPS. NAND gate 260 sets the flip-flop 256 to a binary ONE. NAND gate 260 is enabled, for example, for an increment operation where it is desired to add a binary ONE to the contents of the byte to be incremented or for a subtraction operation when a forced binary ONE must be provided to provide the two's complemented negative number.

It should be noted that if a logical operation is to be performed, neither NAND gates 260 nor 262 are enabled. Thus, the only change of the input can be provided by the concatenated signals from NAND gates 254 and 258. However, NAND gate 258 will not provide a timing signal since it is responsive to bit 10 (U10) of the AUF function. When $\overline{U10}$ is low, a logical operation is provided and hence gate 258 does not provide the timing signal. As a result, flip-flop 256 does not generate a carry signal for any logical operation.

FIG. 7 illustrates the utilization of bit 13 (U13) which has been previously referred to as a test and modify bit. More specifically, exclusive OR gate 300 detects the signals from bit positions 11 and 12, i.e., U11, U12, respectively. For AUF functions 0 to 3 and 13 to 16, exclusive OR gate 300 provides a low signal. For conditions of 4 to 11, exclusive OR gate 300 provides a high signal. The output of exclusive OR gate 300 is one input to multiplexers 302 and 304. The other input to these multiplexers is the test and modify bit or bit 13 in the microinstruction.

Multiplexer 302 has two inputs which it transfers depending on the above bit configuration. Input M01 is the selected main memory 116 location and is coupled to three inputs of multiplexer 302 while the remaining input is coupled to the output of exclusive OR gate 246 shown as AUS. The output of multiplexer 302 is coupled back to the selected main memory 116 location shown as AUM. Multiplexer 304 is responsive to the same input bit combinations as multiplexer 302. However, multiplexer 304 has three inputs the serial register, disignated S01, and a fourth input from the exclusive OR gate 246. The output of multiplexer 304 is coupled back to the serial register via the lead shown as AU0.

The operation of multiplexers 302, 304 is as follows. When bit combination of U12 and U11 provide a low signal from gate 300 or when U13 is a low signal, then multiplexer 302 transfers the source information received from main memory back into its same location. This is shown as MO1 input and AUM output. When bit combination U12 and U13 provides a binary ONE and the U13 signal is high, then the output from exclusive OR gate 246 is written into the source location. This is shown as the AUS input and a AUM output. In this situation, the original source information from main memory is destroyed. It is apparent that a microinstruction is saved since the new computed output is provided into the main memory source location with the same microinstruction.

Multiplexer 304 functions exactly as multiplexer 302. However, multiplexer 304 transfers the output of the originating register, SR1, back into the same location when either exclusive OR gate 300 or U13 provides a low signal. This is shown as SR1 input and AU0 output. If both gates 300 and U13 have high signals, then the output from exclusive OR gate 246 is written into the originating location. This is shown as AUS input and AU0 output. This test and modify bit is thus used in two ways depending on the AUF function. For eight of the arithmetic unit functions, i.e., AUF functions 4 to 11, and for a test and modify bit being a binary ONE, the new computed output as appears at exclusive OR gate 246 is selected to be written back into the source registers. If the test and modify bit is a binary ZERO or the other AUF functions are presented, the old output of the source register is rewritten. In this situation, the source information is simply recirculated. Therefore, at the end of the microinstruction, the prior contents of the source register have been rewritten.

While the principles of the invention have now been made clear in the illustrated embodiments shown above, there will be immediately obvious to those skilled in the art many modifications in structure, arrangement and components used in the practice of the invention without departing from those principles. The appended claims are therefore intended to cover and embrace any such modifications within the limits only of the true spirit and scope of the invention.

What is claimed is:

1. Data processing apparatus comprising:
a plurality of first source means, each providing signals representing a different first word having a plurality of operand bits possessing either a first or second binary state;
second source means for providing signals representing a second word having a plurality of operand bits possessing either a first or second binary state;
a memory for storing representations of a plurality of instructions, each of said instructions including a plurality of segments, the representations of one of said segments enabling one of a plurality of subfunctions to be performed;
means for enabling said memory to provide said plurality of instructions; control apparatus comprising:
means responsive to each of said instructions for selectively controlling the transfer of said signals from one of said plurality of first source means,
means responsive to a first subfunction for performing a logical EXOR operation on said first word of said first source means and said second word of said second source means, and
means responsive to said representations in said one segment for altering the operation of performing forming means such that an operation different than EXOR is performed on said first and said said second words.

2. An apparatus as defined in claim 1 and further including:
first control means, responsive to a second subfunction, for providing a first control signal to said altering means, said first control signal actuating said altering means such that said performing means performs a logical OR operation on said first and said second words.

3. An apparatus as defined in claim 1 and further including:
second control means, responsive to a third subfunction, for providing a second control signal to said altering means, said second control signal actuating said altering means such that
said performing means performs a logical AND operation on said first and said second words.

4. An apparatus as defined in claim 3 and further including:
carry means for providing a carry signal having a first or second binary state, and
third control means, responsive to a fourth subfunction, for providing a third control signal to said altering means, said third control signal actuating said altering means such that said carry signal is summed with said first word of said first source means and said second word of said second source means.

5. An apparatus as defined in claim 1 wherein:
said plurality of first source means includes main memory storage means, a main memory address register, and a plurality of input/output devices, said input/output devices including punched tapes, high and low speed card readers and keyboard typewriters.

6. An apparatus as defined in claim 5 wherein said selectively controlling means includes:
a plurality of first multiplexer means coupled to said plurality of first source means, each of said plurality of first multiplexer means responsive to the signals a second segment of said plurality of instructions for selecting one of said plurality of first source means, and
a second multiplexer means coupled to each of said plurality of first multiplexer means, said second multiplexer means responsive to the signals to a third segment of said plurality of instructions for selecting one of said first multiplexer means, said second multiplexer means transferring an output of one of said plurality of first source means.

7. An apparatus as defined in claim 6 wherein said selectively controlling means further includes:
fourth control means, responsive to a fifth subfunction, for overriding said first selected source means such that a predetermined first word is provided, and
fifth control means, responsive to a sixth subfunction, for inverting said binary state of said first word.

8. An apparatus as defined in claim 1 wherein said second source means includes:
transpose means coupled to said output means, for receiving the previous contents thereof,
means for enabling said transpose means to be said second source means,
sixth control means, responsive to a seventh subfunction, for forcing said enabling means to inhibit said transpose means, said enabling means in response to said sixth control means providing a predetermined second word as said second source means, and
seventh control means, responsive to an eighth subfunction, for forcing said enabling means to inhibit said transpose means, said enabling means in response to said seventh control means providing said predetermined second word as said second means.

9. In a serial bit data processing system, control circuitry comprising:
first means for providing a first input,
second means for providing a second input,
first gating means responsive to said first and second inputs for providing a first output representing one combination of said first and second inputs,
second gating means responsive to said first and second inputs for providing a second output representing a second combination of said first and second inputs,
and logic circuit means responsive to said first and second outputs for summing said first and second outputs, said logic circuit means providing a third output representing more than one combination of said first and second inputs.

10. An apparatus as defined in claim 9 and further including:

a plurality of control means coupled to said control circuitry, each of said control means when enabled providing a distinct operation, said each control means when not enabled providing a predetermined operation unlike those provided by said each control means when enabled.

11. An apparatus as defined in claim 10 wherein said plurality of control means includes:

first control means coupled to said first gating means for providing a first control signal, said first control signal inhibiting said first output of said first gating means, said first gating means in response to said first control means providing a first controlled output, said logic circuit means in response to said first controlled output transferring said second output such that said second combination results.

12. An apparatus as defined in claim 11 wherein said plurality of control means includes:

second control means coupled to said second gating means for providing a second control signal, said second control signal inhibiting said second output of said second gating means, said second gating means in response to said second control means providing a second controlled output, said logic circuit means in response to said second controlled output transferring said first output such that said first combination results.

13. An apparatus as defined in claim 12 and further including:

carry means for providing a carry value, and output means for receiving the output of said logic circuit means, and wherein said logic circuit means includes:

third gating means coupled to said first and second gating means for combining said first and second outputs, said third gating means providing a fourth output representing a third combination of said first and second inputs, and fourth gating means coupled to said third gating means and said carry means for summing said fourth output and said carry means, said fourth gating means providing a fifth output representing a fourth combination of said first and second inputs.

14. An apparatus as defined in claim 13 wherein said plurality of control means includes:

third control means coupled to said fourth gating means for providing a third control signal, said third control signal inhibiting said fifth output of said fourth gating means, said fourth gating means in response to said third control signal transferring said fourth output of said fourth gating means to said output means.

15. An apparatus as defined in claim 14 wherein said first control means provides for a logical AND function, said second control means provides for a logical OR operation, said third control means provides for an arithmetic sum operation, and wherein said predetermined function is an EXCLUSIVE OR operation.

16. An apparatus as defined in claim 9 wherein said first means is selected from a plurality of source means, said plurality of source means including main memory storage means, main memory address register, and input/output devices.

17. An apparatus as defined in claim 16 wherein said first means further includes:

a plurality of multiplexer means coupled to said plurality of source means for selecting one of said plurality of source means, and fourth control means, coupled to said multiplexer means and to said first and second gating means, for inhibiting said selected source means from said plurality of multiplexer means, said fourth control means enabling a fixed first number to be said first input to said first and second gating means.

18. An apparatus as defined in claim 17 wherein said second means includes:

means, coupled to a predetermined register, for receiving the contents of said predetermined register, means for enabling said receiving means to be second input, and fifth and sixth control means for forcing said enabling means to inhibit said receiving means from being said second input, said enabling means in response to either said fifth or sixth control means providing a fixed second number as said second input.

19. In a data processing apparatus, the combination means for storing a microinstruction set and an arithmetic logic unit (ALU) wherein said microinstruction set includes a plurality of words, each word having a segment defining one of a plurality of subfunctions and wherein said ALU includes circuitry responsive to each of said plurality of said subfunctions, said combination comprising:

means responsive to said words for supplying two quantities to said ALU, said ALU including means coupled to said supplying means for providing an exclusive OR operation on said two quantities, and means coupled to said providing means and responsive to said segment for altering said exclusive OR operation, said altering means enabling said providing means to perform one of a plurality of operations on said two quantities provided by said supplying means.

20. The combination as defined in claim 19 wherein said altering means includes:

first means responsive to one selected representation in said segment for inhibiting one of said quantities provided by said supplying means, said first inhibiting means enabling said providing means to provide an arithmetic operation on said other quantity.

21. The combination as defined in claim 20 wherein said altering means further includes:

second means responsive to another selected representation in said segment for inhibiting the other of said quantities provided by said supplying means, said second inhibiting means enabling said providing means to provide a logical operation which transfers said one quantity.

22. The combination as defined in claim 19 wherein said altering means includes:

third means responsive to a third selected representation in said segment for overriding said providing means to enable a logical OR operation to be provided on said quantities provided by said supplying means.

23. The combination as defined in claim 19 wherein said altering means includes:

fourth means responsive to a fourth selected representation in said segment for overriding said providing means to enable a logical AND operation to be provided on said quantities provided by said supplying means.

24. The combination as defined in claim 19 wherein said altering means includes:

fifth means responsive to a fifth selected representation in said segment for overriding said providing means to enable an arithmetic operation to be provided on said quantities provided by said supplying means.

* * * * *